UNITED STATES PATENT OFFICE.

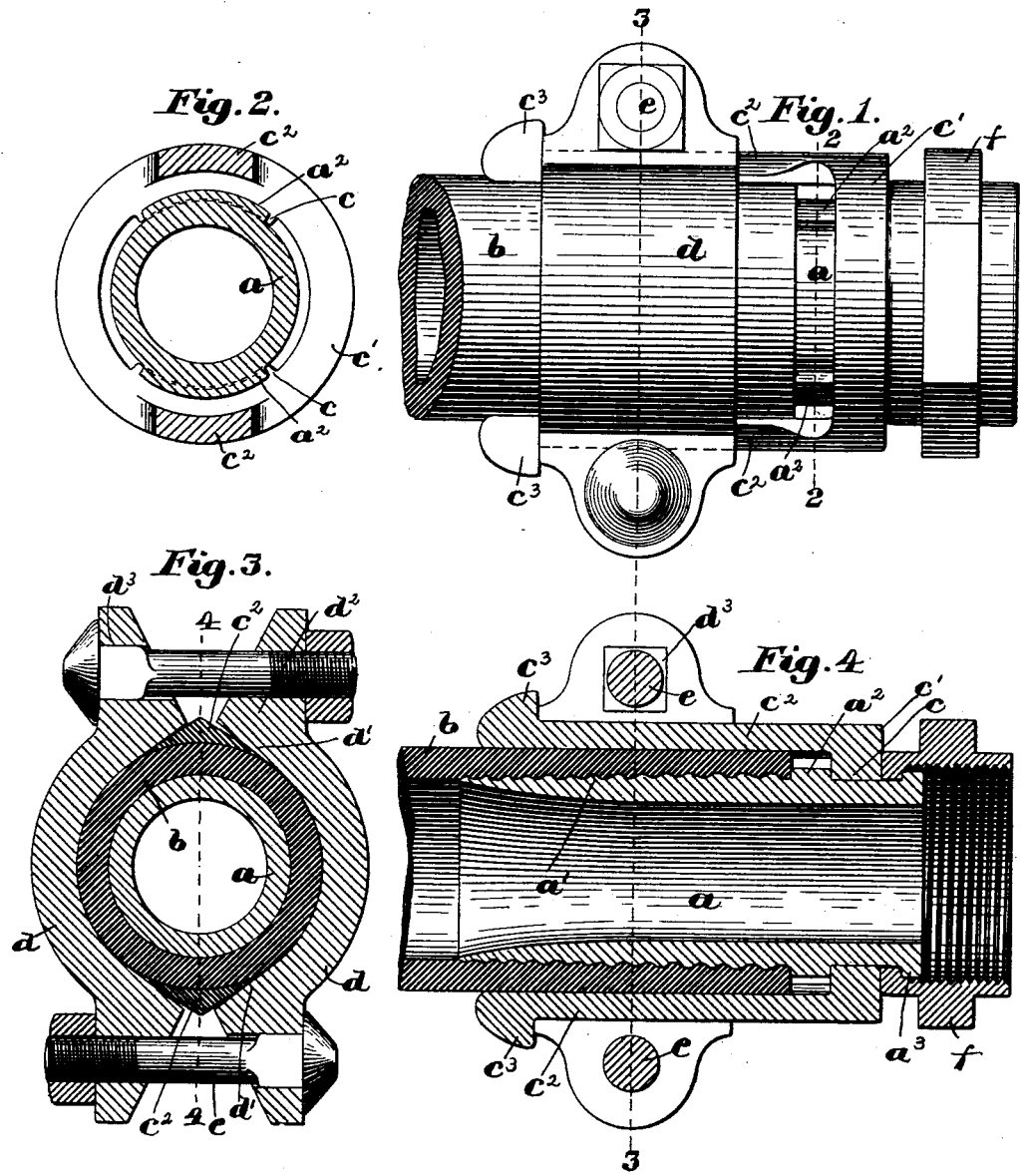

JOHN O. DE WOLF, OF CAMBRIDGE, MASSACHUSETTS, ASSIGNOR TO THE BOSTON WOVEN HOSE AND RUBBER COMPANY, OF BOSTON, MASSACHUSETTS.

HOSE-FITTING.

SPECIFICATION forming part of Letters Patent No. 591,796, dated October 12, 1897.

Application filed December 17, 1896. Serial No. 615,950. (No model.)

*To all whom it may concern:*

Be it known that I, JOHN O. DE WOLF, of Cambridge, county of Middlesex, State of Massachusetts, have invented an Improvement in Hose-Fittings, of which the following description, in connection with the accompanying drawings, is a specification, like letters on the drawings representing the parts.

In connecting hose, making a joint therein, or securing a nozzle thereto it is exceedingly difficult to make the joint water-tight and steam-tight.

Joints are now commonly formed by clamping the hose over an interior metallic thimble by means of metallic straps passed about the hose and having their ends drawn together usually by set-screws. These joints pinch the hose between the ends of the straps and do not uniformly clamp the hose at all points, thereby inviting leaks. The provision of overlapping or interlocking tongues adjacent the meeting ends of these straps does not cure the difficulty of uneven clamping or pressure. Moreover, these overlapping tongues are apt to dig into the surface of the hose.

It is the object of my invention to clamp the hose with a substantially uniform pressure at all points, thereby avoiding pinching up the hose at any one point, as heretofore.

With this end in view I provide one or more wedge members, preferably held on the internal thimble, said wedge members receiving the meeting ends of the clamping members, which are bolted or otherwise tightened about the hose.

As the clamping members or clamps are drawn together they crowd the wedge members inwardly, thereby pressing in on the hose at those places which would otherwise bulge or pinch up, or would at least not be pressed in in the same direction or to the same extent as the remaining circumference of the hose.

My invention also provides a joint of superior rigidity not liable to injure the hose or pull out therefrom.

Further advantages and details of improvement will appear in the course of the following description of my invention, the latter being more particularly defined in the appended claims.

In the drawings illustrative of one embodiment of my invention, Figure 1 is a side elevation of my improved fitting applied to a piece of hose and having a female coupling mounted thereon. Fig. 2 is a vertical cross-section thereof on line 2 2, Fig. 1. Fig. 3 is a similar section taken on dotted line 3 3, Figs. 1 and 4. Fig. 4 is a longitudinal section taken in line 4 4, Fig. 3.

The interior thimble $a$, having, if desired, a corrugated or threaded outer surface $a'$, may be and is of any usual kind, being shown as flaring at its inner end to offer less obstruction to the flow of steam or water therethrough, and slightly tapered exteriorly to enable it to be fitted readily and tightly into any hose $b$ of proper size. Adjacent its outer end the thimble $a$ is shown as having one or more lugs $a^2$, two opposite lugs being shown with cut-away sections between them to coöperate, as a sort of bayonet-joint, with similar lugs $c$ on a collar $c'$.

In the embodiment of my invention herein shown the wedge members $c^2$, shown as two in number and in the form of prongs or legs, are carried by the collar $c'$, said wedge members or legs extending down over the thimble and hose and wedge-shaped in cross-section, being shown in Fig. 3 as tapering off on each side and having lips or stops $c^3$ at their ends, this being my preferred construction.

Clamps $d$, two being shown, preferably in the form of heavy flat bands, extend partially around the hose, just overlapping the edges of the wedge members or legs $c^2$. These clamps are made concentric to the hose for most of their inner surface, being extended therefrom tangentially at $d'$ to overlie the wedge-surfaces of the legs $c^2$, and are provided at their ends with suitable clamping means, as bolts $e$. The legs are shown as concaved on their inner faces to fit snugly on the hose.

The ends of the clamp are preferably thickened at $d^2$ to strengthen them against being sprung over toward each other by the tightening of the bolts and nuts, and preferably a V-shaped gap is left, as shown, between the clamps, so as to afford access to the legs and bolts for convenience.

The bolts are shown as squared adjacent their heads to fit squared apertures $d^3$ in the ends of the clamps.

A nut $f$ is shown as mounted to turn on an end flange $a^3$, the latter forming a seat for a usual packing-ring and gland for making a coupling or other desired joint.

In use the legs or prongs $c^2$ will be loosely slid onto the hose. The thimble $a$ will then be inserted, as shown, within the hose, and the collar $c'$ given a quarter-turn to carry its lugs $c$ behind the shoulders $a^2$ to lock the thimble and collar together. The clamps will then be adjusted about the hose, resting on the edges of the wedge members or legs adjacent the stops $c^3$, and the nuts will be tightened. As the clamps are brought together the ends thereof will crowd together over the inclined surfaces of the legs $c^2$, forcing the latter inwardly the same as the clamps are forced inwardly. The result is that not only is the hose prevented from bulging up between the clamps, but the hose is compressed evenly with a uniform grip at every point, rendering it absolutely steam-tight. Moreover, the broad, flat, and even grip of the clamps and legs on the outside of the hose and the corresponding internal grip of the thimble, the thimble and legs being locked together by the lugs $a^2 c$, render it impossible to pull the hose out of its clamp or to disrupt the joint. The enlarged ends or hooks $c^3$ on the legs $c^2$ prevent the latter pulling out from beneath the clamps, the latter being more or less embedded in the material of the hose, all the parts being thus firmly locked together and to the hose.

I do not restrict my invention to the specific details herein presented, inasmuch as many changes in form, proportion, and combination of parts may be resorted to without departing from the spirit and scope thereof.

Having described my invention, what I claim as new, and desire to secure by Letters Patent, is—

1. In a device of the kind described, the combination with a clamp having portions adapted to be brought together about the hose to be clamped, of one or more wedge-shaped members adapted to be acted upon by and during the said clamping operation to coöperate with the clamp in compressing the hose, substantially as described.

2. A hose-fitting, comprising an inner member to fit within the hose, a clamp to embrace the hose between it and said inner member, an outer leg member, locked to said inner member at its outer end beyond the hose, and extending against the hose beneath and between the ends of said clamp, and provided with means to maintain it in its said position and prevent it from moving longitudinally of the clamp or the clamp transversely of it, substantially as described.

3. A hose-fitting, comprising inner and outer coöperating parts, said parts being adapted to receive the hose between them and being interlocked at their outer ends beyond the hose, said outer part being formed in one piece including a collar to fit around the inner member and a plurality of legs extending from said collar lengthwise of the hose, and an independent clamp overlapping said legs, substantially as described.

4. A hose-fitting, comprising a thimble, a wedge member and a clamp, said wedge member being wedge-shaped in cross-section and adapted thereby to impart a radial pressure to the hose by the tightening of the clamp, substantially as described.

5. A clamp for hose comprising a plurality of members, and including a wedge-shaped member adapted to lie longitudinally of the hose and tapering off on each side, and clamping means overlapping said tapering sides, clamping movement of said means acting against said wedge-shaped member to press it radially inward, substantially as described.

6. A hose-fitting, comprising inner and outer coöperating parts, said parts being adapted to receive the hose between them, and being provided at their outer ends beyond the hose with an interlocking bayonet-joint, said outer part having one or more legs extending lengthwise of the hose, and an independent clamp overlapping said legs to clamp the legs against the hose and thereby clamp the hose immovably between said coöperating inner and outer parts, substantially as described.

In testimony whereof I have signed my name to this specification in the presence of two subscribing witnesses.

JOHN O. DE WOLF.

Witnesses:
J. W. REEMS,
R. B. PRICE.